June 3, 1941.　　　　G. C. MORGAN　　　　2,244,542
DIVISION BOARD ADJUSTMENT FOR LINTER GINS
Filed March 6, 1939　　　　3 Sheets-Sheet 1
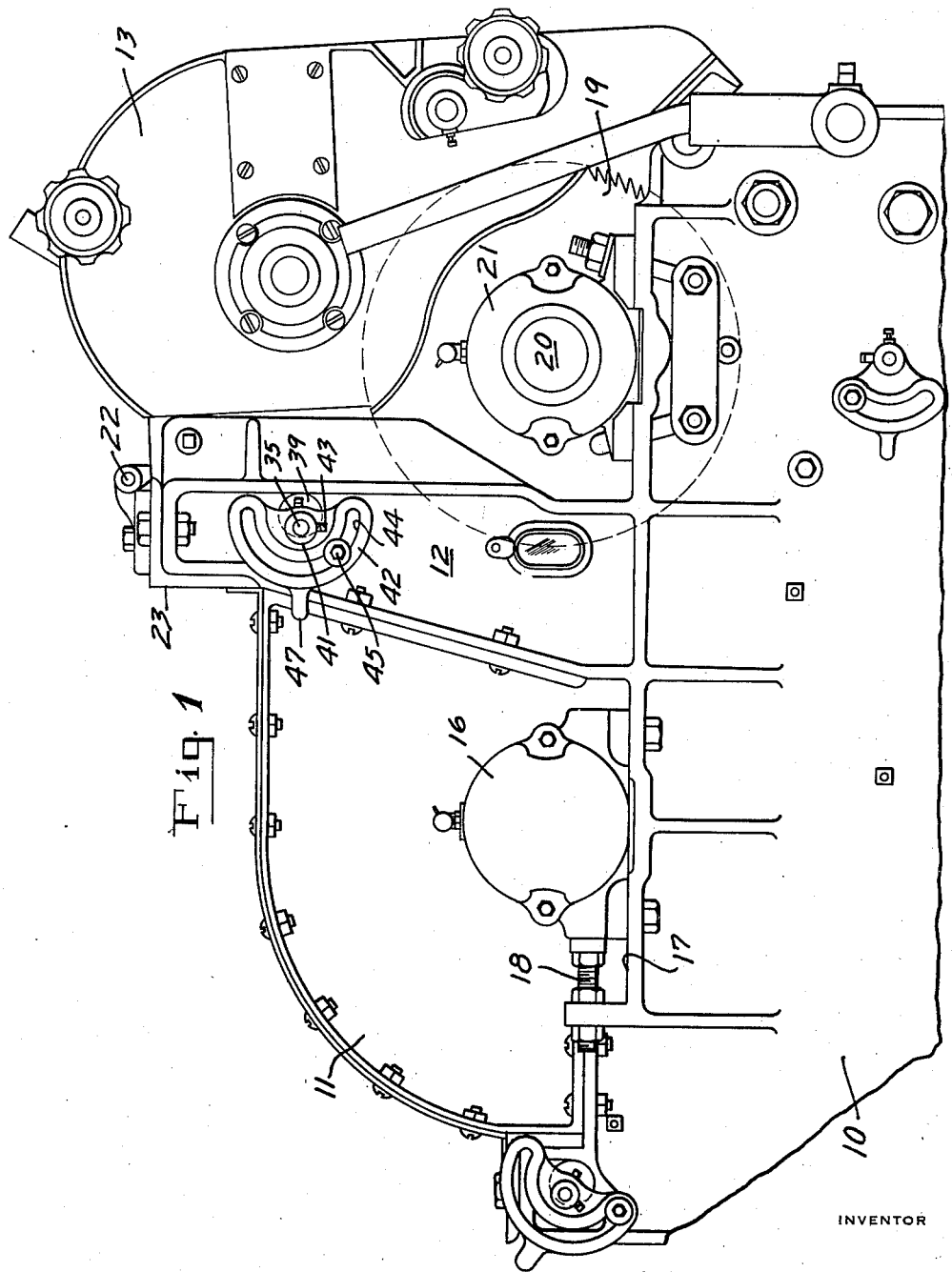
INVENTOR
GEORGE C. MORGAN
BY
ATTORNEYS June 3, 1941.  G. C. MORGAN  2,244,542
DIVISION BOARD ADJUSTMENT FOR LINTER GINS
Filed March 6, 1939  3 Sheets-Sheet 2
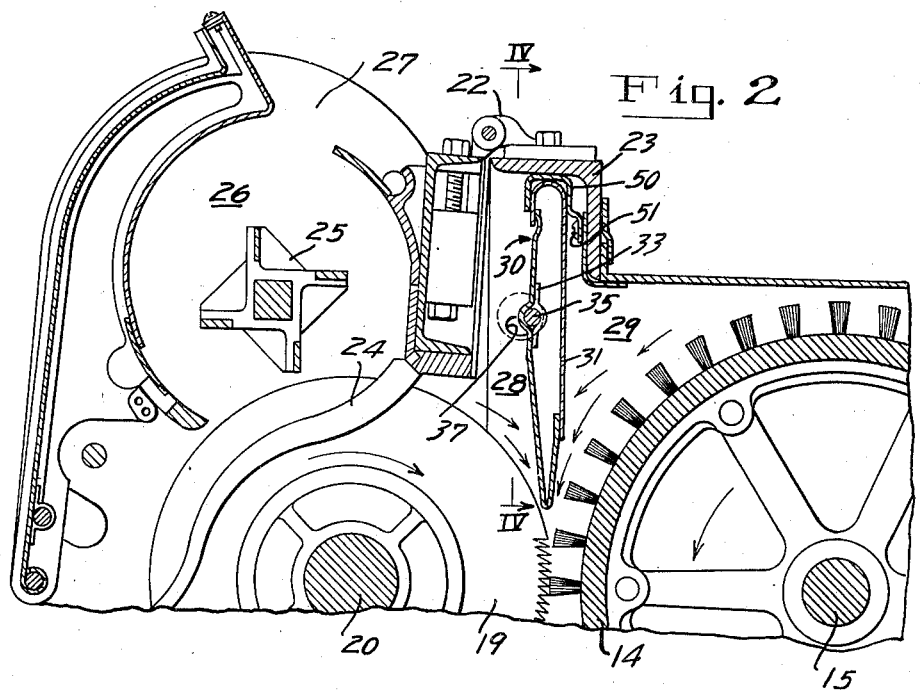
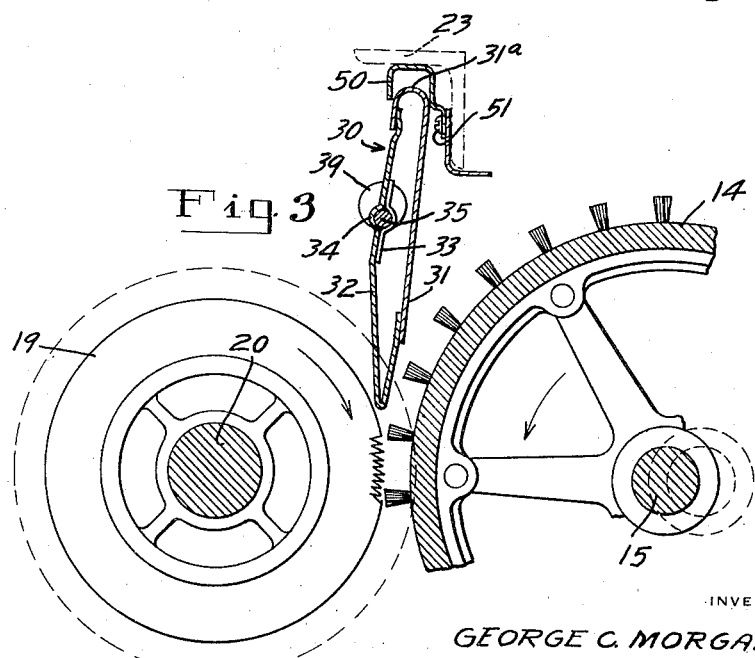
INVENTOR
GEORGE C. MORGAN
ATTORNEYS June 3, 1941.  G. C. MORGAN  2,244,542
DIVISION BOARD ADJUSTMENT FOR LINTER GINS
Filed March 6, 1939  3 Sheets-Sheet 3

INVENTOR
GEORGE C. MORGAN
BY
*Johnston & Jennings*
ATTORNEYS

Patented June 3, 1941

2,244,542

UNITED STATES PATENT OFFICE 2,244,542

DIVISION BOARD ADJUSTMENT FOR LINTER GINS

George C. Morgan, Birmingham, Ala., assignor to Continental Gin Company, a corporation of Delaware Application March 6, 1939, Serial No. 259,972

14 Claims. (Cl. 19—55)

My invention relates to a new and improved means for adjusting the division boards of linter gins.

A division board is an element depending into the throat formed between the adjacent downwardly rotating surfaces of the saw and brush as they approach the doffing and moting point. Its functions are to produce a seal between the brush and saw chambers; to deflect the draft of air, created by the brush, tangentially against the linter saw teeth in such manner as to assist in the removal of lint from saws and to give proper direction to material removed from saws for the moting action that takes place immediately below line of contact between saw and brush; and to deflect into said throat any heavy material thrown off from the saws by centrifugal force.

In the operation of a linter gin, lint is removed from seed between grate members by saws and it follows the saws around to a point where a doffer brush removes it and causes it to be carried through a moting chamber back onto a condenser element. It is desirable to discard heavy or foreign matter that might be present in the lint before carrying the lint onto the condenser. By means of a combination of air drafts, centrifugal force and gravity, such a separation, or moting action, is accomplished, and such action is affected materially by the speed of saw and brush members of the linter. Furthermore, the path of material leaving the saw at the doffing point will be found to vary in relation to speeds of the coacting saw and brush members and to the air draft created by the brush member. Therefore, the proper position of the division board member in relation to saw and brush is important in the control of the air draft created by the brush, and the adjustment from time to time of such board is required to maintain proper operation under varying speed ranges of the machine, varying atmospheric conditions, and varying conditions of delinting, and to compensate for change in the position of contact between the saw and the brush element due to wear.

My present invention contemplates so mounting the division board that it may be readily and accurately adjusted, preferably by external means for convenience of access, and, if desired, by means accessible at both ends of the gin; my invention further contemplates adjusting the board by means of end supports adjustable to produce both horizontal and vertical displacement of the board whereby its lower or working edge can be caused to follow, and adapt itself to, the changing position of engagement between brush and saw as they wear.

My invention further houses the upper edge of the board in a sealing pocket adapted to accommodate the angular and bodily adjustments forward and downward of the board without breaking its top seal between saw and brush chambers.

My invention further contemplates the provision of a common adjusting means adapted to cause the division board to move bodily through a small arc designed to permit it to follow up, and maintain its lower working edge in a constant relative position with respect to, both saw and brush elements throughout their ranges of adjustment.

My invention further contemplates so mounting the division board on intermediate end supports that it is capable of angular movement thereon as well as bodily displacement therewith, the sealing pocket providing a sliding fulcrum for the upper edge of the board about which its lower working edge swings.

My invention further contemplates mounting the division board on axially aligned end trunnions or supports, both of which have an eccentric mounting in the gin end frame members and coact with external clamp means to secure them and the division board they support in the desired adjustment.

My invention further contemplates the novel details of construction and arrangements of parts which are exemplified in their preferred embodiment only in the accompanying drawings, which form a part of this specification, and in which:

Fig. 1 is an end view of a portion of a linter gin equipped with my improved division board adjustment means.

Fig. 2 is a partial vertical transverse cross sectional view through the linter showing the division board in its adjusted relation to unworn brush and saw elements.

Fig. 3 is a view of the brush and saw elements corresponding to Fig. 2 showing the change in position of the doffing point due to the wear of said elements and the adjustment of the division board to maintain correct operating position with worn brush and saw elements.

Similar reference numerals refer to similar parts throughout the drawings.

Figure 4:
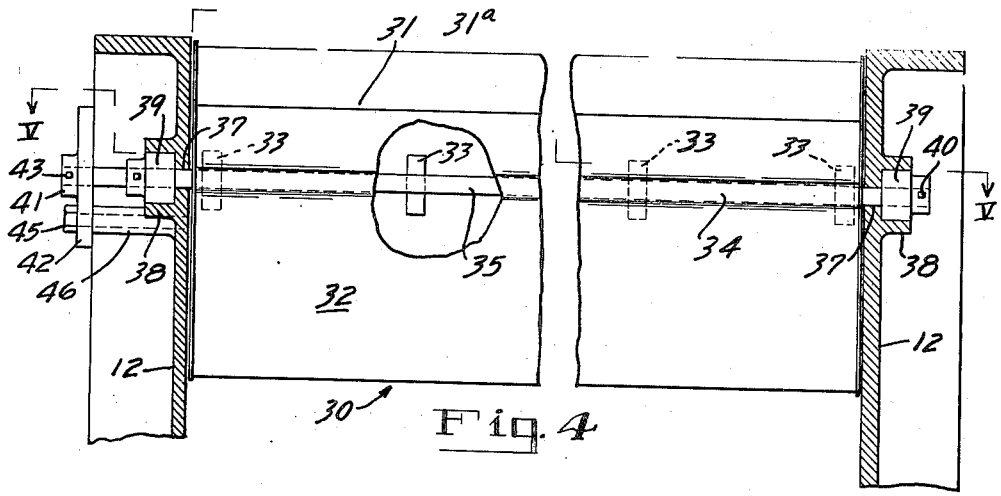
Fig. 4 is a sectional view through the gin heads taken on the line IV—IV of Fig. 2, and showing the division board and its top seal in elevation and partly broken away.
Figure 5:
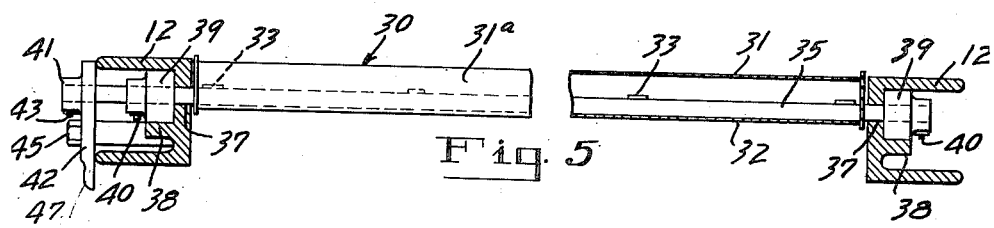
Fig. 5 is a sectional view taken on the broken line V—V of Fig. 4.

In the embodiment of my invention illustrated, I show a linter gin comprising end frame elements 10, 11, 12 and 13. The doffing brush 14 of the gin is mounted on a shaft 15 journalled in end bearings 16 which are each horizontally adjustable on their respective seat 17 by means of a screw 18, whereby the brush can be moved toward the saw 19 as it becomes necessary to compensate for wear of both saw and brush elements. The saw element of a linter gin is removed periodically for sharpening, and the diameter of this saw element is reduced during each saw sharpening action. The saw is mounted on its respective shaft 20 which is journalled in fixed bearings 21 on the end frame. The breast is pivotally connected to the gin frame by means of the hinges 22, which are bolted to the front cap roll 23 (Fig. 2) connected to the end frame members 12 overhead. The saw coacts with the usual gin ribs 24 and the float 25 works in the roll box 26 into which the material to be treated is introduced through the feed opening 27. The saws, as viewed in Fig. 2, rotate in a clockwise direction and the cotton and motes are carried forward with the saw teeth, pass through the chamber 28 (Fig. 2), which I call the saw chamber, down to the point of engagement between saw and brush which constitutes the position of coaction between the saw and brush to effect the doffing and moting operations. The brush will have a counterclockwise rotation, as viewed in Fig. 2, and 29 is a brush chamber through which the air currents set up by the rotation of the brush are directed and deflected downwardly so as to have the proper tangential direction of flow when they enter the throat between the brush and saw elements. My saw cylinder mountings are so designed as to cause the longitudinal axis of the saw cylinder to be always returned to its original position after sharpening and replacement. Such an arrangement is desirable because the saw cylinder bears a definite relation to other elements of the linter, i. e., its grate 24, roll box 26, and brush element. Inasmuch as the saw is centrally located with respect to these several elements it has proven advantageous to have the saw cylinder fixed axially and to cause other elements of the linter to be adjusted relatively to the saw. Furthermore, these elements require adjustment with respect to the saw in the normal operation of the linter, and would, therefore, be made adjustable in spite of wear of the saw.

The parts as thus described are conventional and form no particular part of my invention, which is concerned with the construction and manner of adjustment of the division board 30.

Figure 6:
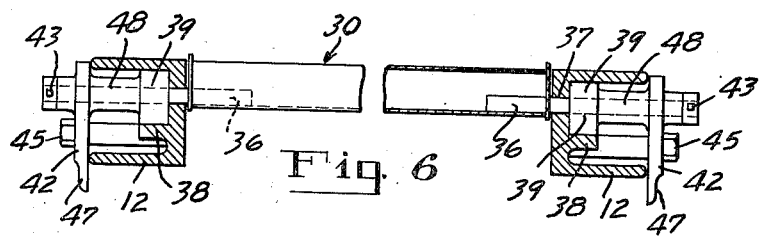
Fig. 6 is a view corresponding to Fig. 5 showing a modification of my invention with an external clamp applied to each eccentrically mounted end support of the division board.

The division board is a generally vertically disposed element extending from end to end of the gin frame and working in close contact with the end frame walls 12 thereof. I preferably form this division board of two longitudinal plates comprising the back plate 31 and the front plate 32, the former having its upper edge bent over on an arc at 31a and downward to overlap and be suitably welded or otherwise attached to the upper edge of plate 32. The lower edge of the plate 32 is bent back at a very acute angle upon itself and slipped under so as to be welded or otherwise suitably secured to the lower edge of the plate 31. I weld or otherwise attach shaft hanger straps 33 to the inner face of the plate 32 and I deform that plate longitudinally above its longitudinal center line to form an arcuate stiffening bead and a seat 34 to receive the shaft 35, or the end stub shafts 36 (Fig. 6), which provide the end supports for the division board.

The shaft 35 extends through and beyond the division board ends, and passes loosely through opposed arcuate slots 37 formed in the end frame members 12. The slots are formed in the inner wall of the eccentric seats 38, formed in the outer face of the frame members 12, and they define arcs concentric with the axis of said seats 38. I secure on each end of the shaft 35 an eccentric collar 39 secured thereto by a key or bolt 40, and, as illustrated in Fig. 4, the left hand end of said shaft projects beyond its eccentric collar 39 and into the hub 41 of an adjusting segment 42, to which it is keyed or otherwise secured by a key or bolt 43. This segment 42, as will be seen more clearly in Fig. 1, has an arcuate slot 44 through which a cap screw 45, threaded into a boss 46 on the left end frame 12, passes freely. The segment also has a handle 47 by which it may be grasped and, when the screw 45 is loosened, turned so as to rock the eccentric collars 39 in unison in their seats 38 and thereby to shift the shaft 35 through its arcuate slots 37 and swing the pivotal support for the division board through a prescribed arcuate path which will effect a lowering, as well as a forward, bodily movement of the division board.

If it be desired to use the stub shafts 36 (Fig. 6) to support the division board, it will be requisite to mount fast on the outer end of each of these stub shafts an eccentric collar 39 which, in this instance is formed integral with a sleeve extension 48 and its respective adjusting segment 42. In this arrangement the adjusting segments 42 must be set at both ends of the gin in corresponding position to accomplish a correct adjustment of the axis of support for the division board, whereas when the board is mounted on a single eccentric shaft, this adjustment can be accomplished at either end of the shaft. All these adjustments can be made externally and quickly.

Since the division board is pivotally supported at its ends by shaft elements 35 or 36, as the case may be, and since it is bodily adjustable through an arcuate path responsive to the rotation of its eccentric collars 39, which control the position of the division board supports, it is necessary to provide means which will cooperate with the upper edge of the division board so as to serve as a seal throughout all of its adjusted positions and also as a fulcrum about which the lower or working edge of the division board can be rocked responsive to the shifting of its eccentric collars. Such a means is provided in the inverted U-shaped casing 50 which extends from end to end of the frame and has at its rear side an offset flange by which it is connected by screws 51 to the vertical leg of the cap rail 23. The upper rounded edge of the division board fits snugly into the seat provided for it in this casing, the seat walls preferably being sprung into engagement with the upper edge of the board to make a tight joint, and they overlap said edge sufficiently to permit the division board to slide downwardly in the casing pocket and to rock angularly throughout its maximum range of adjustment, which is indicated by comparison of Figs. 2 and 3. This top seal casing thus establishes and maintains an upper seal which enables the division board to intercept communication overhead between the saw and brush cylinders 28 and 29 throughout its adjustment range.

As will be observed by comparing Fig. 3 with Fig. 2, the division board is not only lowered and shifted forward by the manipulation of its eccentrically mounted supports, but also it is rocked angularly about the rear wall of the casing 50 as a fulcrum, which causes its forward edge to swing towards the front through an arc greater than the arc of displacement of the upper edge of the board, due to the fact that the axis upon which the board rocks is disposed closer to its upper, than to its lower, edge. The selected pivotal point enables any desired relative increase in angular motion to be imparted to the lower or working edge of the board as compared to that of its upper edge.

In Fig. 3 the saw is shown in full lines as substantially reduced diameter due to wear, the dotted lines indicating its original dimensions. In like manner, the brush is shown with its bristles substantially worn and its shaft 15 has been displaced from its initial dotted position to its full line position, so as to maintain the proper doffing contact with the wearing saws without change in the mounting of the latter.

Fig. 2 shows the division board lifted to its uppermost position when it stands substantially vertical and in its extreme rearward position, the eccentric shaft 35 standing at the upper rear end of slots 37. As the wear progresses of both saw and brush, the latter is constantly adjusted and with each adjustment the cap screw or screws 45 are loosened, the segment plate or plates 42 are rocked so as to shift the eccentric shaft or division board axis downwardly and forward through the slots 47 while its upper edge slides down and rocks on the back or rear wall of the casing 50 as a fulcrum.

If the division board were only angularly adjustable about a fixed axis to follow up the wear of the saw and brush, as such wear progressed the working edge of the board would climb up on the periphery of the saw and would leave the brush to a considerable extent, i. e., it would become displaced from its proper working relation to both elements. If the division board were confined simply to a vertical movement, its adjustment responsive to wear of the saw and brush would raise its working edge on the periphery of the brush and displace it from the saw, with like undesirable results as in the case of only angular adjustments. But by the provision of adjustment means for the division board which move it through a small arc and allow it to rock about an axis in its plane of adjustment, the working edge of the board can follow, and will always maintain a correct relative position with respect to, both saw and brush elements throughout the full range of their adjustment and thus can be set to compensate for any variable condition calling for adjustment of the division board to maintain the desired moting and doffing action.

I attach considerable importance to the fact that the shaft or shafts upon which the division board is mounted project outside of the end frame members of the gin where they are readily accessible for the adjustment and control of the division board, and while I consider the use of the eccentric collars as the simplest means for retaining desired vertical and horizontal adjustment of the division board, it will be obvious that other means may be substituted that will bring about this compound adjustment without departing from the essential novelty of my invention.

The adjustment of the division board by means of a single eccentric shaft, will maintain the self alignment of the division board parallel to the longitudinal axis of the saw throughout all adjustments. The same correct alignment will be maintained when the segments on the stub shaft eccentric collars are set in corresponding adjustment.

While I have shown my invention in but two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a linter gin comprising coacting saw and brush elements, a division board, end pivotal supports for said board and rocker bearings for said supports mounted in the gin eccentric to said supports and means to set said bearings in adjusted positions to shift said board both vertically and horizontally to maintain its proper working relationship to both saw and brush elements as they wear.

2. In a linter gin comprising coacting saw and brush elements, a division board, end pivotal supports for said board and rocker bearings for said supports mounted in the gin eccentric to said supports and means to set said bearings in adjusted positions to shift said board vertically, horizontally and angularly to maintain its proper working relationship to both saw and brush elements as they wear.

3. In a linter gin having coacting saw and brush elements which are relatively adjusted as they wear, a division board, end eccentrics mounted fast on a common shaft on which the board is pivotally mounted free for arcuate and angular play, and means to set said shaft and board in the selected position of adjustment.

4. The combination with a linter gin having coacting saw and brush elements, and a division board separating the brush and saw cylinders overhead, of a common means to adjust the working edge of said board both vertically and laterally to follow the wear of said coacting elements, and an overhead housing designed and arranged to seal the joint between the top of the division board and the gin and maintain said seal throughout the range of adjustment of the division board.

5. A linter gin according to claim 4, in which the overhead housing for the division board is a continuous U-shaped sealing pocket having walls which yieldably engage the upper edge of the division board between them.

6. A linter gin according to claim 4, in which the overhead housing for the division board is a continuous U-shaped sealing pocket with its side walls sprung into engagement with the upper end of the division board and overlapping the latter far enough to maintain spring engagement therewith throughout the full range of adjustment of the division board.

7. In a linter gin having coacting saw and brush elements and end frame members in which said elements are mounted for relative adjustment to compensate for their wear, a division board loosely mounted on end supports, an eccentric collar fast on each of said supports, seats for said eccentrics on said end frames, and clamp means to secure said eccentrics in different adjusted positions.

8. A linter gin according to claim 7, in which said eccentric seats are formed in the outer face of the end frame members and arcuate slits are provided in the inner walls of said seats to permit arcuate movement therethrough of said end shaft supports as the eccentric collars are adjusted.

9. A linter gin according to claim 7, in which said eccentric seats are formed in the outer face of the end frame members and arcuate slots are provided in the inner walls of said seats to permit arcuate adjustment of said end shaft supports and division board, in combination with an external segment operatively connected to each eccentric collar and having means to lock it in set adjusted positions.

10. In a linter gin having coacting saw and brush elements and end frame members in which said elements are mounted for relative adjustment to compensate for their wear, a division board having a longitudinal shaft on which it is pivotally mounted with the shaft projecting beyond its ends, eccentric collars fast on the shaft ends, seats in the frame ends for said eccentric collars, and means to set and secure said collars in different adjusted positions.

11. In a linter gin according to claim 10, in which an arcuate slot is provided through which at least one end of said shaft projects and has arcuate movement responsive to adjustment of said eccentric collars, and external means to lock said collars and division board in their adjusted position.

12. In a linter gin having coacting saw and brush elements, end frames in which said elements are mounted with said brush element only adjustable relative to the saw to compensate for the wear of both elements, a division board, and a mounting means therefor comprising board pivots and rocker bearings therefor mounted eccentric thereto in the gin and capable of shifting the board both vertically and horizontally to maintain its correct relative working relation to both of said elements throughout the full range of their relative adjustment.

13. In a linter gin according to claim 12, in which the division board mountings constitute a single common adjusting means designed to produce an arcuate movement thereof, in combination with means coacting with the upper edge of the division board to maintain a seal between it and the gin overhead.

14. In a linter gin according to claim 12, in which the mountings for the division board are disposed in intermediate position in its ends, and comprise coacting elements which shift the division board through an arcuate path downwardly and forwardly and permit of its angular adjustment, in combination with a top U-shaped seal slidably coacting with the top edge of the division board and adapted to form a seal and fulcrum for same throughout its range of adjustments.

GEORGE C. MORGAN.